United States Patent
McGinnis et al.

(10) Patent No.: US 8,795,525 B2
(45) Date of Patent: Aug. 5, 2014

(54) UTILITY SCALE OSMOTIC GRID STORAGE

(75) Inventors: Robert McGinnis, Coventry, CT (US); Aaron Mandell, Boston, MA (US)

(73) Assignee: Oasys Water, Inc., Boston, MA (US)

( * ) Notice: Subject to any disclaimer, the term of this patent is extended or adjusted under 35 U.S.C. 154(b) by 630 days.

(21) Appl. No.: 12/630,816

(22) Filed: Dec. 3, 2009

(65) Prior Publication Data
US 2010/0183903 A1 Jul. 22, 2010

Related U.S. Application Data

(60) Provisional application No. 61/119,544, filed on Dec. 3, 2008.

(51) Int. Cl.
| | |
|---|---|
| B01D 61/06 | (2006.01) |
| B01D 61/08 | (2006.01) |
| B01D 61/10 | (2006.01) |
| C02F 1/44 | (2006.01) |
| C02F 1/04 | (2006.01) |
| B01D 61/00 | (2006.01) |
| C02F 1/14 | (2006.01) |
| C02F 1/16 | (2006.01) |
| F03G 7/00 | (2006.01) |

(52) U.S. Cl.
CPC ........... *B01D 61/002* (2013.01); *B01D 61/005* (2013.01); *B01D 61/10* (2013.01); *C02F 1/445* (2013.01); *C02F 1/048* (2013.01); *C02F 1/14* (2013.01); *C02F 1/16* (2013.01); *F03G 7/005* (2013.01); *Y02E 10/36* (2013.01); *Y02E 10/38* (2013.01); *Y02E 10/40* (2013.01); *Y02E 10/50* (2013.01); *Y02E 10/70* (2013.01); *Y10S 203/01* (2013.01); *Y10S 203/18* (2013.01); *Y10S 203/21* (2013.01)
USPC ............ 210/321.66; 210/652; 210/321.6; 203/DIG. 1; 203/DIG. 17; 203/DIG. 20; 290/54

(58) Field of Classification Search
None
See application file for complete search history.

(56) References Cited

U.S. PATENT DOCUMENTS 3,587,227 A 6/1971 Weingarten
(Continued)

FOREIGN PATENT DOCUMENTS

| CN | 2695490 Y | 4/2005 |
|---|---|---|
| DE | 3121968 A1 | 1/1983 |

(Continued)

OTHER PUBLICATIONS

Mehta, Gurmukh. "Further Results on the Performance of Present-Day Osmotic Membranes in Various Osmotic Regions". Journal of Membrane Science 10 (1982) pp. 3-19.

Panyor et al. "Renewable Energy from Dilution of Salt Water with Fresh Water: Pressure Retarded Osmosis". Desalination 199 (2006) pp. 408-410.

(Continued)

*Primary Examiner* — Krishnan S Menon
(74) *Attorney, Agent, or Firm* — Lando & Anastasi, LLP

(57) ABSTRACT

Systems and methods for the storage of potential energy that may be readily converted to electrical power delivered to a customer or grid distribution are disclosed. This method may involve the use of salinity gradients, or as they may be also described, osmotic pressure gradients or differences between two solutions, to produce hydraulic pressure in a concentrated solution, allowing for the generation of power.

13 Claims, 9 Drawing Sheets

(56) References Cited

U.S. PATENT DOCUMENTS

| | | | |
|---|---|---|---|
| 3,906,250 A | 9/1975 | Loeb | |
| 3,978,344 A | 8/1976 | Jellinek | |
| 4,141,825 A | 2/1979 | Conger | |
| 4,177,146 A | 12/1979 | Popper et al. | |
| 4,193,267 A | 3/1980 | Loeb | |
| 6,185,940 B1 | 2/2001 | Prueitt | |
| 7,566,402 B2 | 7/2009 | Thorsen et al. | |
| 7,780,852 B2 | 8/2010 | DeVoe | |
| 7,871,522 B2 | 1/2011 | Stover et al. | |
| 7,898,102 B2 | 3/2011 | Alstot et al. | |
| 7,922,873 B2 | 4/2011 | St. Germain et al. | |
| 2005/0016924 A1 | 1/2005 | Devoe | |
| 2006/0225420 A1 | 10/2006 | Al-Mayahi et al. | |
| 2009/0071902 A1* | 3/2009 | Stover et al. | 210/637 |
| 2010/0024423 A1 | 2/2010 | McGinnis et al. | |
| 2010/0192575 A1 | 8/2010 | Al-Mayahi et al. | |

FOREIGN PATENT DOCUMENTS

| | | |
|---|---|---|
| JP | 57-012802 A | 1/1982 |
| JP | 2003176775 A | 6/2003 |
| JP | 2004505764 A | 2/2004 |
| RU | 2110118 C1 | 4/1998 |
| RU | 2150021 C1 | 5/2000 |
| WO | 2005017352 A1 | 2/2005 |
| WO | 2007/033675 A1 | 3/2007 |
| WO | 2007033675 A1 | 3/2007 |
| WO | 2008/060435 A2 | 5/2008 |
| WO | 2008060435 A2 | 5/2008 |
| WO | 2011004303 A1 | 1/2011 |

OTHER PUBLICATIONS

Cath et al. "Forward Osmosis: Principles, Applications, and Recent Developments". Journal of Membrane Science 281:70-97 (2006).
Skilhagen et al. "Osmotic Power—Power Production Based on the Osmotic Pressure Difference Between Waters With Varying Salt Gradients". Desalination 220 (2008) pp. 476-482.
Gerstandt et al. "Membrane Processes in Energy Supply for an Osmotic Power Plant". Desalination 224 (2008) pp. 64-70.
Loeb et al. "Energy Production at the Dead Sea by Pressure-Retarded Osmosis: Challenge or Chimera". Desalination 120 (1998) pp. 247-262.
Loeb et al. "Large Scale Power Production by Pressure-Retarded Osmosis, Using River Water and Sea Water Passing Through Spiral Modules". Desalination 143 (2002) 115-122.
Loeb et al. "One Hundred and Thirty Benign and Renewable Megawatts From Great Salt Lake? The Possibilities of Hydroelectric Power by Pressure-Retarded Osmosis". Desalination 141 (2001) pp. 85-91.
McGinnis et al. "A Novel Ammonia-Carbon Dioxide Osmotic Heat Engine for Power Generation". Journal of Membrane Science 305 (2007) pp. 13-19.
McGinnis et al. "Global Challenges in Energy and Water Supply: the Promise of Engineered Osmosis". Environ. Sci. Technol. 2008, 42, 8625-8629 (Online Dec. 1, 2008).
Mehta et al. "Internal Polarization in the Porous Substructure of a Semipermeable Membrane Under Pressure-Retarded Osmosis". Journal of Membrane Science 4 (1978) pp. 261-265.
Mehta et al. "Performance of Permasep B-9 and B-10 Membranes in Various Osmotic Regions and at High Osmotic Pressures". Journal of Membrane Science 4, (1979) pp. 335-349.

* cited by examiner

UTILITY SCALE OSMOTIC GRID STORAGE

CROSS-REFERENCE TO RELATED APPLICATION

The present application claims priority under 35 U.S.C. §119(e) to U.S. Provisional Application Ser. No. 61/119,544 titled "UTILITY SCALE OSMOTIC GRID STORAGE" filed on Dec. 3, 2008 which is hereby incorporated herein by reference in its entirety for all purposes.

FIELD OF THE TECHNOLOGY

One or more aspects relate generally to osmotic separation. More particularly, one or more aspects involve use of hydro-electric generation via engineered osmosis processes, such as forward osmosis, for utility scale grid storage.

BACKGROUND

Existing grid storage options, such as flow batteries, lithium-ion batteries, flywheels, compressed air, capacitors, hydrogen storage and hydro-storage all have significant drawbacks that have prevented them from being viable solutions to the grid storage conundrum. In addition, the vast majority of power generation is thermal in nature such that the electricity must be produced immediately as there is no efficient means for storing heat for long periods of time without losses. Grid storage is the key to unlocking the inherent inefficiencies in the electrical grid and to maximizing the output from the consumption of fossil resources. To date, the energy industry has no economical large-scale electrical storage options. There is a need for better and more efficient use of the electrical energy produced by providing storage facilities that buffer the differences between production and demand.

SUMMARY

In accordance with one or more embodiments, a solution for utility scale grid storage is disclosed herein that can provide power reliability to renewable energy sources that are inherently unreliable in nature, such as solar, thermal, photovoltaic (PV), wind, hydro, biomass and tidal. A large scale osmotic battery is disclosed that can store large amounts of low cost power and discharge it at high rates on demand. In this way, renewable utility operators can be provided with a grid storage solution that allows for 24-hour a day continuous power production without interruption. In addition, the disclosed utility scale grid storage solutions can be used in conjunction with any type of thermal power generation process (coal, nuclear, gas, oil) to provide a storage component whereby a portion of the energy can be stored and delivered at any time on demand. In some aspects, heat energy, which cannot be stored efficiently, may be converted into a form of "stored hydro" energy in the form of chemical potential (osmotic pressure) that can be stored indefinitely without any leakage or loss of energy. Alternately, electrical energy may also be stored as "hydro" energy in the form of chemical potential (osmotic pressure).

In accordance with one or more embodiments, a method of operating an osmotic battery is disclosed. The method may comprise providing a source of a dilute salt solution, separating the dilute salt solution to form a concentrated solution and a substantially deionized solution, and storing energy as a chemical potential difference between the concentrated solution and the substantially deionized solution. In at least one embodiment, the concentrated solution may comprise an ammonia-carbon dioxide solution. In some embodiments, separating the dilute salt solution may comprise introducing the dilute salt solution to a thermal stripping method. In at least one other embodiment, the concentrated solution may comprise an inorganic salt solution. In another embodiment, the concentrated solution may comprise an organic solute solution or a mixture of organic and inorganic solutes.

In some embodiments, storing energy as a chemical energy potential difference may comprise storing energy based on a difference in salinity. The method may further comprise converting the chemical energy potential difference to electrical power. In some embodiments, converting the chemical energy potential difference to electrical power may be performed using an electrodialysis reversal process. In other embodiments, converting the chemical energy potential difference to electrical power may be performed using a pressure retarded osmosis process. In several embodiments, converting the chemical energy potential difference to electrical power may be performed using a hydro-electric turbine and generator.

The pressure retarded osmosis process may comprise pressurizing at least a portion of the concentrated solution. The pressure retarded osmosis process may further comprise increasing a volume of at least a portion of the pressurized concentrated solution. Increasing the volume may comprise introducing at least a portion of the dilute solution to the pressurized concentrated solution by means of membrane flux. Increasing the volume may also comprise generating hydraulic pressure using a semi-permeable membrane based on the osmotic pressure difference between the concentrated solution and the dilute solution. The pressure retarded osmosis process may further comprise decreasing the pressure of at least a portion of the volume of the pressurized solution to generate electrical power. Decreasing the pressure may comprise flowing the pressurized solution through a turbine. The method may further comprise introducing the depressurized solution to a separation unit. The method may further comprise using a turbine in conjunction with an electric generator to produce electrical power. The separation unit may produce dilute and reconcentrated streams for reuse in the process. In an alternate embodiment, a separate working fluid in conjunction with a pressure exchanger may be used to transfer pressure from the dilute pressurized draw solution to create a separate pressurized fluid in contact with the turbine. In this manner, the composition of the pressurized working fluid may be chosen for its compatibility with the desired turbine materials, for example, such that the turbine is not exposed to high salinities. Thus, a turbine fluid stream may be selected independently of the compositions of the concentrated draw solution and the substantially dilute working solution.

In some embodiments, the separation unit may comprise a distillation column, a pervaporation unit or a membrane separation unit. The method may comprise powering the separation unit with electricity. In other embodiments, the separation unit may be powered with low grade or low quality heat generated by an upstream unit operation. In other embodiments, the separation unit may be powered directly with heat generated by burning a fossil fuel such as coal, gas, or oil. In other embodiments, the separation unit may be powered directly with heat generated from nuclear energy or a nuclear reaction. In other embodiments, the separation unit may be powered with heat generated from geothermal or solar thermal sources. In other embodiments, the separation unit may be powered directly with heat generated from produced fluids such as those in oil and natural gas extraction, coal bed methane production, fracturing of gas shale and geothermal resources as well as carbon dioxide from enhanced oil recovery. In other embodiments, the separation unit may be powered directly with heat generated from heating and cooling water such as those used in district cooling systems as well as co-generation processes where the reject heat is utilized for municipal heating. The method may further comprise providing water generated by the separation unit to an industrial, irrigation or potable point of use. The method may still further comprise delivering the electrical power to a point of use. The method may still further comprise storing energy in the form of dilute and concentrated solutions for long periods of time and then delivering power when it is needed.

In some embodiments, the step of using electrical energy to separate the dilute salt solution comprises introducing the dilute salt solution to a nanofiltration, reverse osmosis or electrodeionization (EDI) process. In at least some embodiments, the process which generates electricity from the potential energy comprises a pressure retarded osmosis process. In other embodiments, the process which generates electricity from the potential energy comprises a reverse electrodialysis (RED) process.

In accordance with one or more embodiments, an osmotic energy storage system is disclosed. The osmotic storage system may comprise a pressure retarded osmosis unit comprising a semipermeable membrane, a source of a concentrated solution fluidly connected to a first inlet of the pressure retarded osmosis unit, a source of a dilute solution fluidly connected to a second inlet of the pressure retarded osmosis unit, and a turbine fluidly connected downstream of the pressure retarded osmosis unit.

In some embodiments, the system may further comprise a distillation column fluidly connected downstream of the turbine. The distillation column may be fluidly connected to the concentrated solution source and the dilute solution source. The system may further comprise a source of heat energy thermally connected to the distillation column. In another embodiment, a source of electrical energy may be connected to an RO system for separation of the dilute draw solution into low solute water and a reconcentrated draw solution. In some embodiments, the source of heat energy may comprise a renewable energy source. In at least one embodiment, the renewable energy source may comprise a solar, tidal, biomass, hydro or wind power system. In other embodiments, the system may further comprise a source of electricity connected to the distillation column.

In other embodiments, the system may further comprise a pervaporation unit or a membrane separation unit fluidly connected downstream of the turbine. In at least one embodiment, a reverse osmosis unit may be fluidly connected downstream of the turbine. The system may further comprise a controller configured to detect an energy demand from the grid energy distribution system.

In some embodiments, the system may further comprise an industrial, irrigation or potable water point of use fluidly connected to an outlet of the distillation column. The system may further comprise a grid energy distribution system electrically connected downstream of the turbine. A base load electricity generation plant may be connected to the grid energy distribution system. In at least one embodiment, the base load electricity generation plant may be based on coal or natural gas or nuclear.

In accordance with one or more embodiments, a method of operating an osmotic battery may comprise providing a source of a dilute salt solution, separating the dilute salt solution to form a concentrated solution and a substantially dilute working solution, storing the concentrated solution in fluid isolation from the substantially dilute working solution, and maintaining a concentration gradient between the concentrated solution and the substantially dilute working solution to store energy as a chemical energy potential difference between the concentrated solution and the substantially dilute working solution.

In accordance with one or more embodiments, an osmotic energy system may comprise a pressure retarded osmosis unit comprising a semipermeable membrane, a potential energy storage unit comprising a source of a concentrated solution fluidly connected to a first inlet of the pressure retarded osmosis unit and a source of a dilute working solution fluidly connected to a second inlet of the pressure retarded osmosis unit, a turbine fluidly connected downstream of the pressure retarded osmosis membrane unit and an electrical generator connected to the turbine unit.

In accordance with one or more embodiments, a method of operating an osmotic battery may comprise providing a source of a dilute salt solution, using electrical energy to separate the dilute salt solution to form a concentrated solution and a substantially dilute working solution, storing the concentrated solution and the substantially dilute working solution, maintaining a concentration gradient between the concentrated solution and the substantially dilute working solution to harness potential energy, and introducing the concentrated solution and the substantially dilute working solution to process which generates electricity from the potential energy in response to a power demand. In some embodiments, the step of using electrical energy to separate the dilute salt solution comprises introducing the dilute salt solution to a nanofiltration, reverse osmosis or electrodeionization (EDI) process. In at least one embodiment, the process which generates electricity from the potential energy comprises a pressure retarded osmosis process. In other embodiments, the process which generates electricity from the potential energy comprises a reverse electrodialysis (RED) process.

In accordance with one or more embodiments, a method of operating an osmotic battery may comprise introducing a dilute salt solution to a thermal separation process to form a concentrated solution and a substantially dilute working solution, storing the concentrated solution and the substantially dilute working solution, maintaining a concentration gradient between the concentrated solution and the substantially dilute working solution to harness potential energy, and introducing the concentrated solution and the substantially dilute working solution to a pressure retarded osmosis process to generate electricity from the potential energy in response to a power demand. In some embodiments, the thermal separation process comprises a distillation process.

In accordance with one or more embodiments, an osmotic energy system may comprise a grid energy delivery system, an electrochemical generator electrically coupled to the grid energy delivery system, and a potential energy storage unit comprising a source of a concentrated solution fluidly connected to a first inlet of the electrochemical generator and a source of a dilute working solution fluidly connected to a second inlet of the electrochemical generator. In some embodiments, the electrochemical generator comprises a reverse electrodialysis (RED) unit.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are presented in the accompanying figures. The figures are provided for the purposes of illustration and explanation and are not intended as a definition of the limits of the invention. In the figures.

DETAILED DESCRIPTION

Figure 1:
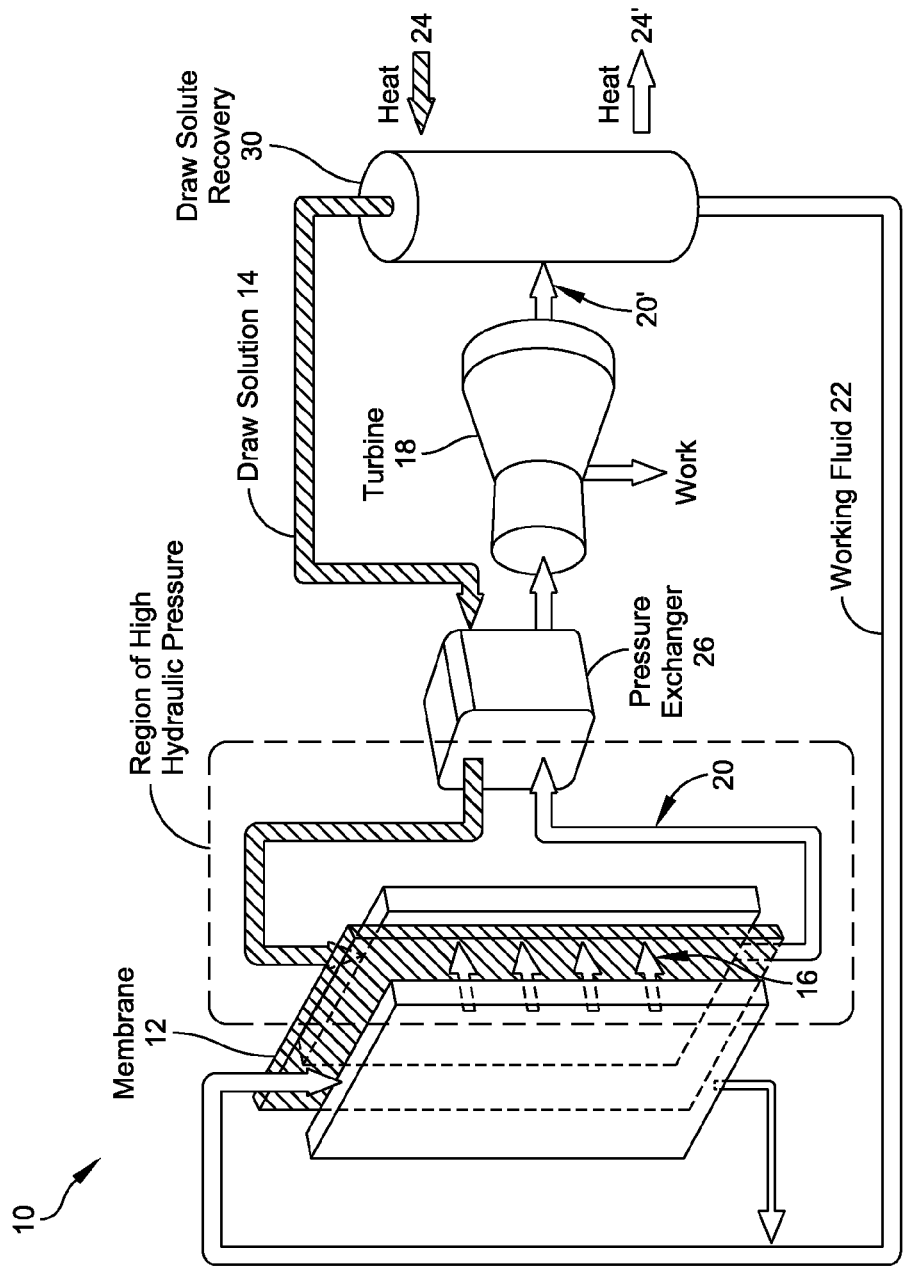
FIG. 1 presents a first embodiment of an osmotic battery in accordance with one or more aspects.

In accordance with one or more embodiments, systems and methods are disclosed which may be used for power generation as well as for electricity storage. More specifically, systems and methods for osmotic storage as well as osmotic power generation are disclosed. One or more embodiments described herein relate to hydroelectric generation which decouples the storage of energy and the production of power. The disclosed pumped hydroelectric power systems and methods use osmotic potential to generate hydraulic pressure. Since the systems and process may largely be non-thermal, the creation of stored energy may be decoupled from the generation of power. Certain aspects allow for the storage of energy from thermal as well as electric sources. In accordance with one or more embodiments, disclosed osmotic grid storage systems and methods may be effective in grid leveling and managing grid demand response. In accordance with one or more embodiments, an osmotic battery or osmotic storage device may store potential energy for the electrical grid in places that it is needed so that it does not need to be transported long distances incurring electrical losses. Embodiments may also serve as a mechanism for making less reliable sources of power, such as renewables, as consistent as base load sources, such as coal, nuclear and gas.

In accordance with one or more embodiments, differences in salinity is a mechanism by which energy is stored. Energy may be stored by separating fresh water from a highly concentrated salt solution or brine. The amount of fresh water stored may represent the amount of energy available on demand. When power is needed, osmotic pressure between the fresh water and brine may create a high osmotic pressure that causes water to spontaneously flow across a membrane. The flow of water may then be directed through a turbine to generate electrical power.

In accordance with one or more embodiments, disclosed osmotic batteries may store energy as a chemical potential relating to a difference in salinity between first and second solutions. Energy can be stored in large amounts and discharged rapidly through a process called pressure retarded osmosis (PRO) based on the salinity difference. Pressure retarded osmosis may generally relate to deriving osmotic power or salinity gradient energy from a salt concentration difference between two solutions, such as a concentrated draw solution and a dilute working fluid. In some examples, a draw solution may be a first solution and fresh water or nearly deionized water may be a second solution. In some embodiments, one or more membrane modules may be enclosed in a pressure vessel to facilitate pressure retarded osmosis. Within pressure retarded osmosis, a draw solution may be introduced into a pressure chamber on a first side of a membrane. In some embodiments, at least a portion of the draw solution may be pressurized based on an osmotic pressure difference between the draw solution and a dilute working fluid. The dilute working fluid may be introduced on a second side of the membrane. The dilute working fluid may generally move across the membrane via osmosis, thus increasing the volume on the pressurized draw solution side of the membrane. As the pressure is compensated, a turbine may be spun to generate electricity. In some embodiments, a pressure retarded osmosis module may be operated at pressures between about 0 and 2000 psi. Some non-limiting pressure retarded osmosis embodiments may involve pressures between 1000-2000 psi. A resulting dilute draw solution may then be processed, such as separated, for reuse. In some embodiments, a low temperature heat source, such as industrial waste heat may be used in or facilitate a pressure retarded osmosis system or process.

One non-limiting embodiment of a disclosed osmotic battery is schematically presented in FIG. 1. The first step of the process may be similar to an osmotic heat engine process such as, for example, that described in PCT Application Publication No. WO200S/060435 which is hereby incorporated herein by reference in its entirety for all purposes. An osmotic heat engine 10 may convert potential energy into mechanical work using a semi-permeable membrane 12 to convert osmotic pressure into electrical power. In some embodiments, a concentrated draw solution 14, such as an ammonia carbon dioxide draw solution, may create high osmotic pressures which generate water flux 16 through a semi-permeable membrane 12 against a hydraulic pressure gradient. Depressurization of the increased draw solution volume 20 in a turbine 18 may produce electrical power. The process may be maintained in steady state operation through the separation of diluted draw solution 20' into a re-concentrated draw solution 14 and deionized water working fluid 22, both for reuse in the osmotic heat engine 10. In accordance with one or more embodiments, a dilute draw solution 20' of salts may then be separated into a concentrated draw solution 14 and a nearly deionized working solution 22. In some embodiments, waste heat 24 including any form of heat rejected from a power generation process or industrial process may be used to drive the separation operation 30. In at least one non-limiting embodiment, waste heat 24 may be low grade heat, for example, heat at below about 200° C. In other embodiments, electric power may drive the separation process 30. The resulting solutions are inherently stable and safe. These solutions may store energy in the difference in their chemical energy potentials, or salinities.

In accordance with one or more embodiments, the energy capacity of the storage device may be directly dependent on the difference in salinity between the two solutions and the volumes of the solutions stored. As long as these solutions are separately increased in volume, power is stored. When power is needed by the recipient or grid, the differences in salinity between the two solutions may be converted into electrical power by means of pressure retarded osmosis. In some embodiments, the concentrated draw solution may be pressurized by the osmotic pressure difference between the two solutions, and the flow of water from the dilute solution across the semi-permeable membrane may increase the volume of the pressurized solution. The increased volume of the pressurized draw solution may be decreased by flow through a turbine, which reduces the solution pressure, producing power. The depressurized solution may then be treated, such as by the introduction of heat, to separate it into concentrated and dilute solutions again for energy storage, available for on demand power delivery once again. This power can be used to offset the downtimes associated with renewable power generation.

In accordance with one or more embodiments, osmotic systems and methods may be used for grid energy storage. Grid energy storage relates generally to large-scale energy storage in which electrical energy is stored during time when production exceeds consumption for subsequent use at times when consumption exceeds productions. Thus, production can be maintained at a fairly constant level rather than drastically scaled up and down in response to momentary consumption. Grid energy storage generally enables easier and more efficient operation and production.

Osmotic grid storage as disclosed herein has many advantages over conventional grid storage options. In at least some embodiments, there is no fuel cost because waste heat may be used rather than electricity and there is no electrical loss. The systems are capable of large-scale operation due to multi-megawatt storage capacities. Rapid discharge and high power output is also possible. The disclosed storage systems are easy to permit and site, not requiring special geography or geology. In some non-limiting embodiments, the systems may operate at 75-80% round trip electrical efficiency and may involve low energy operation. The systems are low cost with no expensive components. There is also no energy leakage in that the salinity difference is a permanent storage mechanism. The systems are also safe with no dangerous or hazardous materials or components. In addition, large-scale osmotic storage is simple in design and at least some embodiments may require minimal equipment such as storage tanks (standard large scale water storage), separation equipment such as conventional distillation columns, strippers and absorbers, hydraulic turbines, and osmosis membranes.

As such, disclosed osmotic batteries can be built almost anywhere and can service a burgeoning renewable energy industry. Furthermore, because they may be charged using waste heat instead of electricity, the efficiency of existing power plants may be enhanced and a no-value waste product may be converted into valuable on demand peak power. The energy that is stored in the disclosed devices may provide standby power, be used to level energy output and add reliability to powered processes. In addition, the carbon footprint of power generators can be lowered increasing overall efficiency and carbon offsets can be immediately generated.

In accordance with one or more embodiments, low-grade heat may be transformed into stored solutions which differ in salinity such that at any time they may be used to generate electrical power by pressure retarded osmosis. Disclosed osmotic batteries and grid storage systems may be decoupled into a separation portion, which uses heat or electricity to separate a dilute draw solution into a concentrated draw solution and a dilute working fluid, and an electricity generation portion, which uses the two solutions (concentrated draw solution and dilute working fluid) to generate electrical power. Heat may therefore be transformed into chemical potential energy (in the form of osmotic pressure differences between two solutions) from the use of these solutions. A semi-permeable membrane may be used to generate hydraulic pressure which may in turn be reduced in a turbine, generating electrical energy.

In some embodiments, potential energy generated by the use of heat in a thermal separation process, such as one involving a distillation column, may be stored in the form of two solutions accumulated to any arbitrary volumes in tanks. By accumulation of, for example, saline and dilute solution volumes, potential energy may be stored. The larger the volume of the two solutions, and the greater the difference in their salinities, the larger is the energy storage. In this manner, disclosed systems and methods may operate asynchronously for energy storage. When power production is desired, the two solutions may be combined through a semi-permeable membrane generating electrical energy. The power output may be related to the osmotic pressure difference between the two solutions, the hydraulic pressure on the draw solution, and the membrane area used among other parameters. The decoupling of the separation of salt and water providing the energy source, from the production of power using pressure retarded osmosis, provides unique storage characteristics and advantages.

The draw solution may be an aqueous solution, i.e., the solvent is water. In other embodiments, nonaqueous solutions such as organic solvents may be used. The draw solution may generally include one or more draw solutes, such as thermolytic salts, monovalent salts, divalent salts, organic solutes, and mixtures thereof. The draw solution may contain a higher concentration of solute relative to the first solution. The draw solution may generally be capable of generating osmotic pressure within an osmotic separation system. A wide variety of draw solutions may be used. In some embodiments, the draw solution may include one or more removable solutes. In at least some embodiments, thermally removable (thermolytic) solutes may be used. For example, the draw solution may comprise a thermolytic salt solution. Desirable characteristics may include an ability to generate high osmotic potential and having thermally decomposable and strippable solute properties. In accordance with one or more embodiments, the draw solution may be an ammonia-carbon dioxide solution. In some embodiments, the ammonia-carbon dioxide draw solution may enable desalination to facilitate grid energy storage as disclosed herein. The draw solution may be referred to herein as a concentrated solution. In some non-limiting embodiments, the draw solution may be a concentrated solution of ammonia and carbon dioxide. In at least one embodiment, the draw solute used may be an ammonia-carbon dioxide draw solution described in WO2008/060435 incorporated above. Ammonia and carbon dioxide draw solutions such as those disclosed in U.S. Patent Application Publication Number 2005/0145568 to McGinnis and U.S. Pat. No. 6,391,205 to McGinnis, each of which is hereby incorporated herein by reference in its entirety for all purposes may also be used.

In accordance with one or more embodiments, the ratio of ammonia to carbon dioxide should generally be matched to the concentrations of the draw solution and the temperatures used in the draw solute removal and recovery processes. If the ratios are not sufficiently high, it may not be possible to completely absorb the draw solute gases into salts for reuse in the concentrated solution, and if the ratio is too high, there will be an excess of ammonia in the draw solution which will not properly condense in a desired temperature range, such as that necessary for the use of waste heat to drive the process. For example, in some embodiments a distillation column may strip gases at about 50° C. and an absorbing column may operate at about 20° C. The ratio of ammonia to carbon dioxide should further be considered to prevent the passage of ammonia into the feed solution through the membrane. If the ratio is too high, this may cause unionized ammonia to be present in higher concentrations in the draw solution (normally primarily ammonium) than are necessary or desirable. Other parameters, such as feedwater type, desired osmotic pressure, desired flux, membrane type and draw solution concentration may impact the preferred draw solution molar ratio. The ratio of ammonia to carbon dioxide may be monitored and controlled in an osmotic separation process.

In at least one embodiment, the draw solution may comprise ammonia and carbon dioxide in a molar ratio of greater than 1 to 1. In some non-limiting embodiments, the ratio for a draw solution at approximately 50 C, and with the molarity of the draw solution specified as the molarity of the carbon dioxide within that solution, may be at least about 1.1 to 1 for up to 1 molar draw solution, about 1.2 to 1 for up to 1.5 molar draw solution, about 1.3 to 1 for up to 3 molar draw solution, about 1.4 to 1 for up to 4 molar draw solution, about 1.5 to 1 for up to 4.5 molar draw solution, about 1.6 to 1 for up to 5 molar draw solution, about 1.7 to 1 for up to 5.5 molar draw solution, about 1.8 to 1 for up to 7 molar draw solution, about 2.0 to 1 for up to 8 molar draw solution and about 2.2 to 1 for up to 10 molar draw solution. These are approximately the minimum ratios needed for stable solubility of solutions of these concentrations at this approximate temperature. At lower temperatures, higher ratios of ammonia to carbon dioxide may be required for the same concentrations. At higher temperatures, lower ratios may be required, but some pressurization of the solution may also be required to prevent decomposition of the solutes into gases. Ratios greater than 1 to 1, even at overall concentrations of less than 2 molar greatly increase the stability of the solutions and prevent evolution of carbon dioxide gas and in general thermolytic splitting of the draw solutions in response to even moderate amounts of heat and or reduction of pressure.

In accordance with one or more embodiments, the ratio of ammonia to carbon dioxide may substantially allow for the full absorption of the draw solution gases into an absorbing fluid. In accordance with one or more embodiments, a portion of the dilute draw solution may be used to absorb draw solute gases, such as from a distillation column. In at least one embodiment, both cooling and mixing with an absorbent may occur in an absorption column. The mixing of the gases with a portion of the dilute draw solution acting as an absorbent (to then become the concentrated draw solution) may occur in a vessel. The vessel may generally be sized to provide an area large enough to facilitate interaction between the absorbent and the gases. In some embodiments, a packed column may be used as an absorber. A stripping distillation column and an absorbing column may be used in conjunction in one or more embodiments. Heating may occur in a distillation column while cooling and contact with the dilute draw solution absorbent may occur in an absorbing column. In some embodiments, a first portion of dilute draw solution may be directed to a distillation column and a second portion of dilute draw solution may be directed to an absorber. A stream exiting the distillation column may be introduced to the absorber where it is mixed with dilute draw solution for return so as to reintroduce draw solutes to the draw side of a forward osmosis membrane. The concentration, volume, and flow rate of the draw solution should generally be matched to the concentration, volume and flow rate of the first solution, such that the desired difference in osmotic pressure between the two solutions is maintained throughout the membrane system. This may be calculated in accordance with one or more embodiments taking into consideration both internal and external concentration polarization phenomena in the membrane and at its surface.

Figure 2:
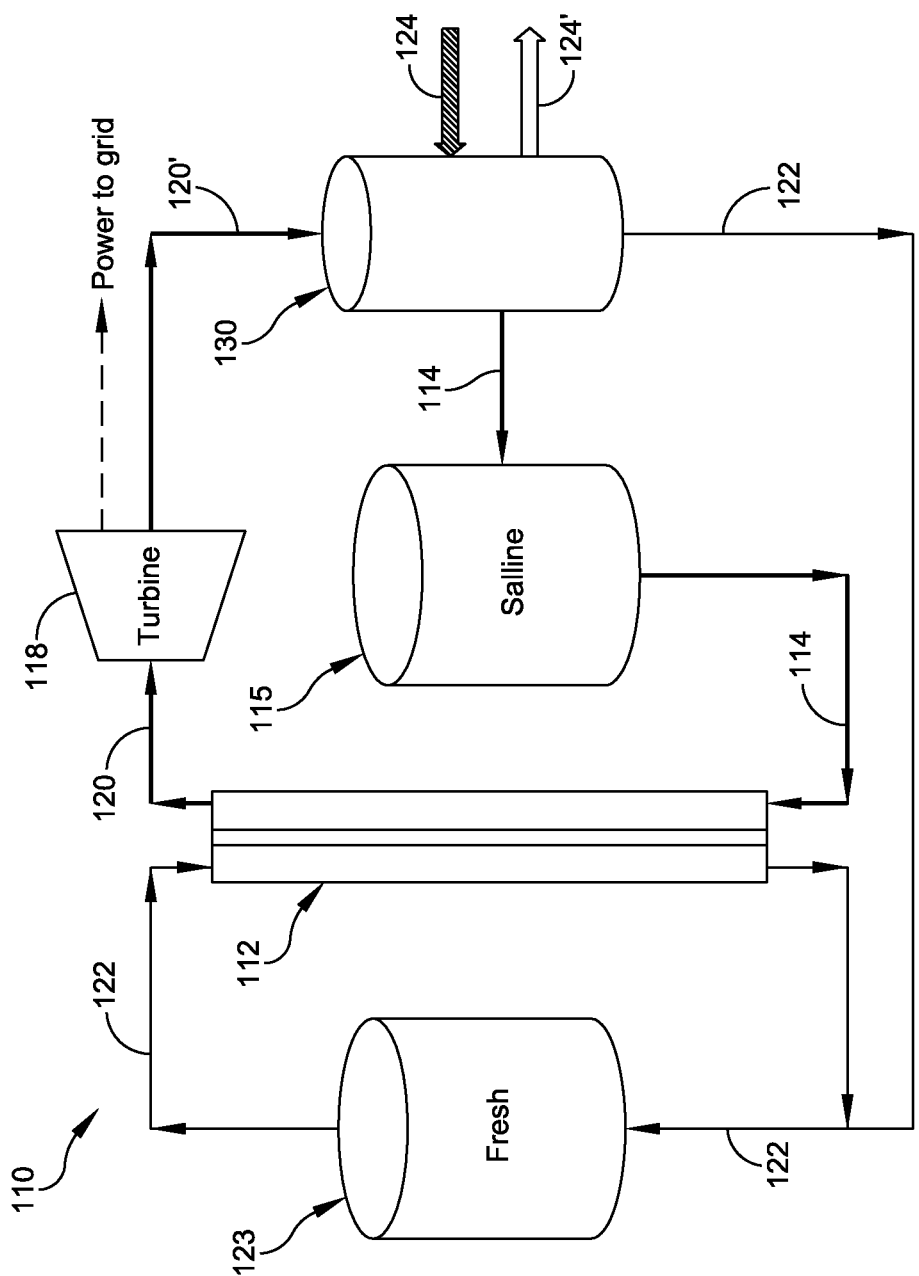
FIG. 2 presents a second embodiment of an osmotic battery in accordance with one or more aspects.

With reference to FIG. 2, the fresh (dilute working fluid 122) solution and saline (concentrated draw solution 114) storage tanks 123, 115 are shown, these achieving the storage of chemical potential energy in the difference in salinity between them. The turbine-generator 118 may convert the increase in volume of the pressurized draw solution 114 into electrical energy by depressurizing the dilute draw stream 120. Not shown are a pressure exchanger and a booster pump which may transfer hydraulic pressure from the dilute draw stream 120 to the concentrated draw stream 114 to maintain a constant pressure, or the desired range of dynamic pressure, in the draw solution pressurized section. The rightmost tank 130 represents a distillation column used for the separation of the dilute draw solution 120' into concentrated and dilute streams 114, 122, and the arrows to the right of the column indicate the introduction 124 and rejection 124' of heat (rejection at lower temperature). A third tank, not shown, may be used to hold the diluted draw solution 120' (combined fresh and saline solutions), for any period of time before this solution is separated into the fresh and saline solutions described above via thermal (i.e. using waste heat) or electric processes.

In accordance with one or more embodiments, salinity differences in a closed cycle reverse osmosis-pressure retarded osmosis (RO-PRO) system may be used to store electrical power as a chemical potential difference in two solutions, as the difference in concentration and osmotic pressure between them. In this embodiment, electrical energy may be used to pressurize a saline stream such that when passed along the surface of a semi-permeable membrane, the concentration of this stream occurs, and dilute water is produced on the permeate side. The concentrated solution and dilute solution may be stored in separate tanks, and by this means, the electrical energy may be transformed into potential energy in the difference in osmotic pressure between the two solutions. The energy capacity of the system may be dictated by the volumes of the two solutions and the difference in osmotic pressure between them. This potential energy may be stored over long periods without degradation and the storage medium is inherently safe. The power output may be generally related to the osmotic pressure difference between the two solutions, the hydraulic pressure on the draw solution, and the membrane area used.

When electrical energy is desired, the two solutions may be used in a closed cycle PRO process to generate electrical power, by inducing flux of water from the dilute solution, across the semi-permeable membrane, into the pressurized draw solution. This increase in volume of the draw solution may be depressurized in a turbine, creating electrical power using a generator. In some embodiments, the efficiency of this process may be nearly identical to the efficiency of pumping water up an elevation gradient (pumped hydro), in that the pressurization pump and turbine efficiencies are similar. Inefficiencies may be due to any pressure exchanger (95-98% efficient) implemented and related booster pump used to maintain the pressure of the draw solution by hydraulic pressure transfer between the exiting dilute draw solution and the incoming concentrated draw solution, as well as by frictional pressure losses in the piping, heat transfer, and membrane systems. The overall efficiency of energy storage is expected to be greater than 75%. In this embodiment, it may be desirable to use a thermal stripping and absorption system as a solute blow down to maintain low concentrations of solutes in the dilute stream, as there may be a tendency for these to cross into the permeate during the RO step. In some embodiments, a periodic blow down of the dilute solution could be carried out, with a recharge of dilute water, to maintain a low concentration of solutes in the dilute stream.

In an alternate embodiment, nanofiltration (NF) membranes rather than RO membranes might be used for the energy storage combined with PRO for power production. In some embodiments using divalent salts as the draw solutes, NF membranes may perform the same functions but provide reduced resistance to water flux.

In other embodiments, other solutes may be used, such that they may be periodically reduced in concentration from the dilute solution (permeate of RO step), by any separation means that is effective in their removal and does not have too large an adverse impact on the overall efficiency. An example of such a secondary separation step would be an ion exchange resin system on the dilute stream, recharged with the concentrated draw solution or with acid and/or base. An example of such a solute could be a variety of divalent salts. Other draw solutes could be used in the electrical storage variant if they create high osmotic pressure, and are well rejected by the RO or NF and PRO membranes. In an alternate embodiment, divalent salts could be used in the electrical variant with high rejection RO and PRO membranes, as their passage into the permeate would be very small. Alternately, solutes with near complete rejection by the membrane could be employed, such as low molecular weight charged organic molecules or trivalent salts. In an alternate embodiment, a solute which undergoes a precipitation with a change in temperature could be used as the draw solute, which may include organic and/or inorganic solutes. The separation of these solutes in the energy storage phase could be carried out wholly or in part by a thermal manipulation of the dilute draw solution, with or without a membrane separation step.

In some embodiments, the draw solute used may be sodium chloride or any other salt or osmotic agent, but one of two conditions should be met for the use of such conventional solutes: the membrane should be nearly 100% effective in rejecting salt passage (e.g. carbon nanotubes or aquaporin like membranes), or the dilute solution should be periodically blown down and replaced with fresh, very low salinity water, or subjected to a secondary separation step to maintain the low concentration of solutes in the dilute working fluid. This is due to the accumulation of salts that would occur in the dilute draw solution over repeated cycles of energy storage and delivery, as draw solutes passed into the permeate of the RO operation phase of the plant, which would cause undesirable internal concentration polarization in the PRO system or reduce the effectiveness of a reverse electrodialysis (RED) or other power generating system. In this way, the dilute working fluid solution may be maintained at low salinity over an arbitrary number of cycles.

In other embodiments, the draw solute used may be an ammonia-carbon dioxide solute, such as may be derived from an ammonia-carbon dioxide thermolytic salt draw solution osmotic agent. Such draw solutes may result from a forward osmosis desalination process or an osmotic heat engine process including but not limited to those described in WO2008/060435, U.S. Pat. No. 6,391,205 and U.S. Patent Publication No. US2005/0145568, each being incorporated above by reference in its entirety for all purposes. In this configuration, small quantities of draw solute may be expected to pass into the dilute solution during the RO phase of operation, but these may be periodically or continuously removed and recycled to the concentrated solution by the use of thermal separation of the solutes from the dilute solution by the addition of heat, by for example, the use of a distillation column as is described in the forward osmosis desalination and osmotic heat engine processes referenced above, as well as that described in PCT Application Publication No. WO2007/146094 which is hereby incorporated herein by reference in its entirety for all purposes. As such, the dilute working fluid solution may be maintained at low salinity over an arbitrary number of cycles.

In accordance with one or more embodiments, it may be important to maintain the low salinity of the dilute solution, to prevent internal concentration polarization in the membrane structure. In accordance with one or more embodiments, salts other than the ammonia-carbon dioxide draw solutes may be used. This may be particularly desirable if the separation and recombination means involve high rejection. For example, if a membrane that rejected nearly 100% of all salts is used, then any salt, including NaCl and MgCl could be used.

Figure 3:
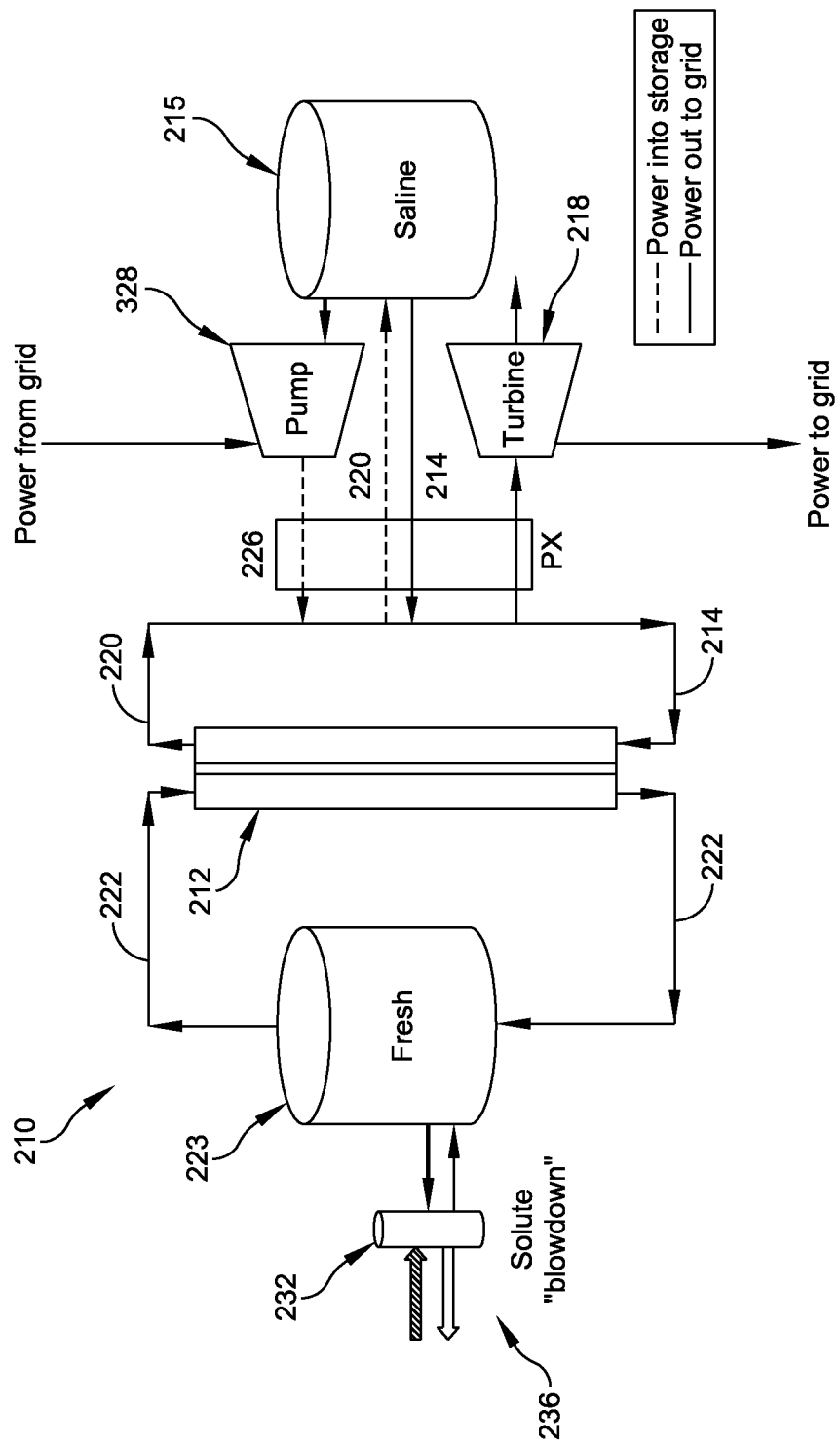
FIGS. 3 and 3A presents third and fourth embodiments of an osmotic battery in accordance with one or more aspects.

With reference to FIG. 3, the fresh solution and saline solution tanks 223, 215 may hold the dilute working fluid 222 and concentrated draw solution 214, respectively. The pump 228 may be used to cause pressurization of the concentrated solution 214, leading to the permeation of the dilute solution through the semi-permeable membrane 212 into the dilute solution tank, designated "fresh". This may have the effect of concentrating the saline solution 214. By the storage of arbitrary volumes of fresh and saline solutions 222, 214 of differing salinity (osmotic pressures), the difference in chemical potential of these solutions may be used as a stable, inherently safe energy storage means. A third tank, not shown, may be used to hold the diluted draw solution (combined fresh and saline solutions), for any period of time before this solution is separated into the fresh and saline solutions described above by the use of electrical power to induce reverse osmotic flow through the membrane. This system may have two modes of operation: RO to store power as differences in salinity between two solutions, and PRO to transform this difference in salinity into electrical power.

For PRO operation, the pressure exchanger 226 shown may be used with a booster pump (not shown) to maintain the pressure on the concentrated draw solution 214 by transferring hydraulic pressure from the exiting dilute draw solution 220 to the incoming concentrated draw solution 214, to transform the salinity difference between the two solutions into electrical power. This power production may be achieved by allowing the pressurized, expanding volume of dilute draw solution 220 to depressurize in the turbine 218, for example, as described above with respect to separation and pressure retarded osmosis processes. The leftmost vessel is a small distillation column 232 which may be used to periodically or continuously remove solutes from the dilute solution 220, by means of heat stripping of the solutes, to maintain the low salinity of the solution. Alternately, a dilute solution blow down and recharge cycle 236 may be used to maintain low salinity in this solution.

Figure 3A:
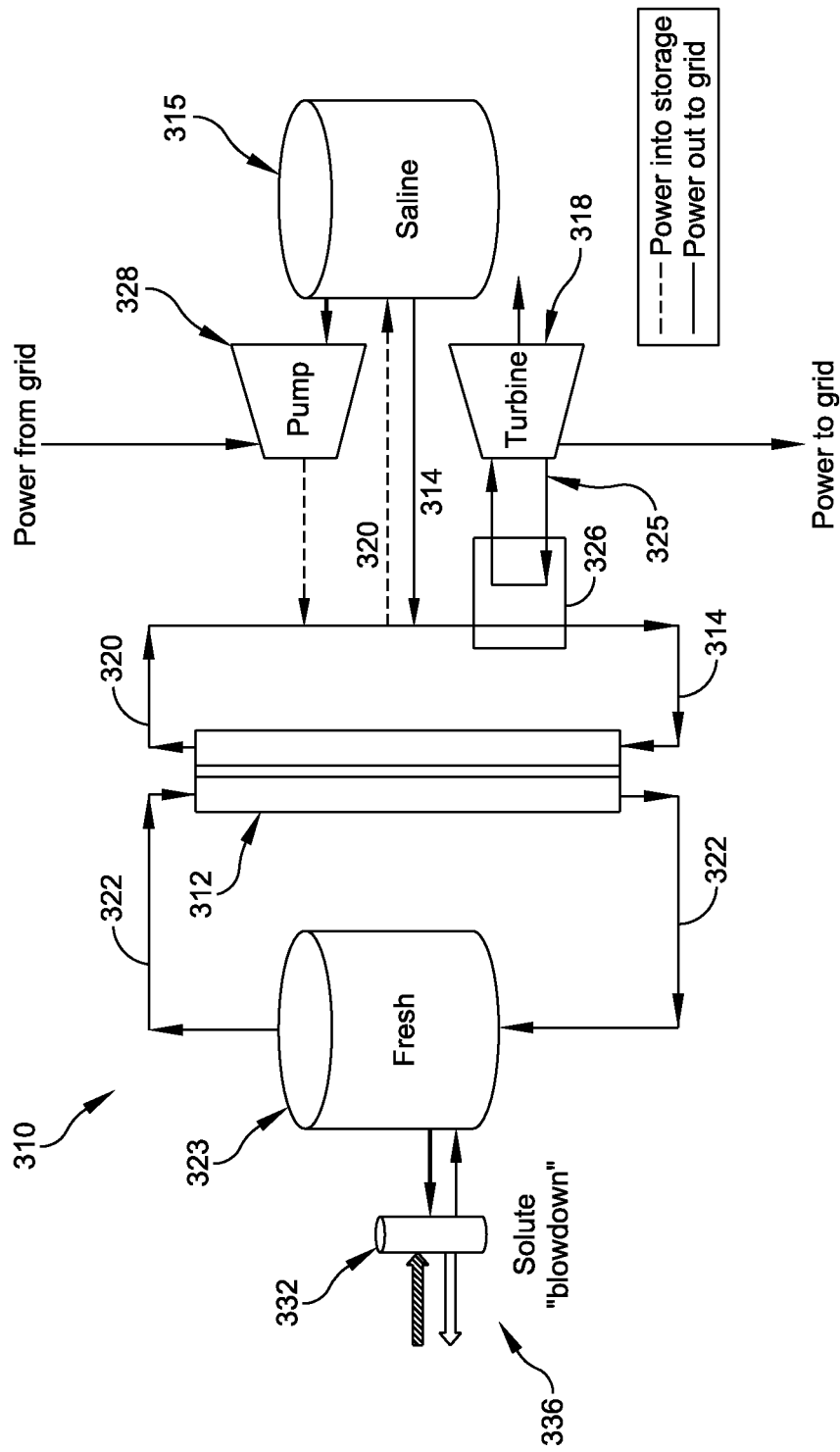

An alternate embodiment of the system of FIG. 3 is shown in FIG. 3A. As shown in FIG. 3A, a separate working fluid 325 in conjunction with a pressure exchanger 326 may be used to transfer pressure from the dilute pressurized draw solution 320 to create a separate pressurized fluid (working fluid 325) in contact with the turbine 318. In this manner, the composition of the pressurized working fluid 325 may be chosen for its compatibility with the desired turbine materials, for example, such that the turbine is not exposed to high salinities.

Additional embodiments that may be employed include the use of electrodialysis, ion exchange, capacitive deionization, pervaporation, membrane separation or other separation means in lieu of the use of RO or the distillation column, for the separation of the dilute solution into concentrated and dilute streams. RED or other electrochemical techniques for generating electricity from salinity differences may be used in lieu of the pressure retarded osmosis step. The technology disclosed herein is broadly directed to various approaches of using heat or power to separate, and the later or simultaneous recombination of these solutions to produce power.

In some embodiments, one or more disclosed osmotic storage devices and methods may be implemented to improve or increase an overall efficiency of an electrical plant. For example, disclosed systems and methods may be used to supplement conventional, base load electrical generation from sources such as coal and natural gas and nuclear. Existing plants may therefore be retrofitted in accordance with one or more embodiments for enhanced efficiency, reliability and storage.

In some nonlimiting embodiments, water power potential between a fresh solution and a concentrated draw solution may be about 300 bar or nearly 10,000 feet of hydraulic head. In at least some nonlimiting embodiments, overall system efficiency may be in the range of 55% to 85%. In at least one embodiment, the efficiency obtainable is at least about 75%.

In accordance with one or more embodiments, a water product may be generated by the disclosed systems and methods. A water product may have one or more characteristics or qualities rendering it useful or desirable in various applications. A water product may be treated water. In at least one embodiment, a water product may be desalinated water. Thus, in addition to stored energy, i.e. electricity, water may be provided to a point of use or customer depending upon demand. In some non-limiting embodiments, for example, a water product may be provided for use in industrial, irrigation or potable applications. The water product may be produced through a separation process described herein.

In some embodiments, osmotic storage devices and methods may be charged by waste heat as disclosed herein. Energy storage efficiency, as a percentage of input energy returned, may therefore be rendered substantially irrelevant in certain aspects. In at least one embodiment, osmotic storage devices and methods may be charged using only waste heat. Heat may come from conventional thermal power generation sources. In some embodiments, coal, natural gas, nuclear and oil power generation sources may provide the waste heat. For example, power generation or combined heat and power (CHP) systems involving boilers, gas turbines and reciprocating engines may provide waste heat. Industrial or commercial boilers for steam and heat generation may provide waste heat. Heat may also come from unconventional sources such as solar thermal power generation, geothermal power generation, district heat and cooling water, or produced fluids such as from oil and natural gas extraction, fracturing and enhanced oil recovery operations. In still other embodiments, heat may be cogenerated on site such as through distributed generation combined with osmotic storage or combined utility scale power generation and osmotic storage.

In other embodiments, an electrical version of the devices and methods may be implemented as described above. Generated electricity may be supplied to devices of such embodiments to power one or more unit operations thereof. In such embodiments, energy storage efficiency may be a significant consideration. In at least one embodiment, hybrid systems and methods may rely upon waste heat as well as electricity.

Osmotic grid storage systems in accordance with one or more embodiments may be used for thermal power generation. An osmotic grid storage device may be used in conjunction with any thermal power generation source to capture and convert reject heat to stored, on demand power. The osmotic grid storage systems disclosed can charge up to 24 hours per day with the reject heat from the power plant and supply large amount of hydro power at peak times during the day when power is need and most expensive. This may increase the overall efficiency of the plant, reduce the carbon footprint and also provide on-demand functionality for a portion of the total power output that is not a capability that exists today.

Osmotic grid storage systems in accordance with one or more embodiments may also be used for solar thermal storage or geothermal storage. Geothermal heat extracted from the ground either from a conventional hydrothermal source or from an enhanced geothermal system (EGS) source can be converted to stored energy. This may increase the overall efficiency of a geothermal power plant and also adds a storage component. If stored power is more valuable, more heat or higher temperature heat can be sent to the osmotic grid storage system for increased storage rather than to the binary plant for immediate power generation. In some embodiments, an osmotic grid storage system can be combined with an organic rankine cycle (ORC) to provide the most efficient use of heat down to temperatures as low as 40° C.

In accordance with one or more embodiments, disclosed osmotic storage systems may be used for small scale storage. An osmotic grid storage system can be scaled down to small sizes, for example, in the 1-20 MW range for distributed, industrial or consumer power storage applications. An osmotic grid storage system can be integrated with small scale reciprocating engines or generators for example to capture the reject heat and provide on-demand electrical power. Small scale osmotic grid storage systems can also utilize heat from industrial appliances such as furnaces, hot water heaters and small boilers. Even smaller scale osmotic grid storage systems can also utilize simple solar collectors such as those found on rooftops to provide on-demand power.

In accordance with one or more embodiments, osmotic grid storage systems may be used for nuclear storage. An osmotic grid storage system can be coupled with nuclear energy to store large amounts of on-demand power. Nuclear energy is an extremely efficient method of generating heat with no carbon impact. This heat can be used directly or indirectly as in the form of wasted heat to power an osmotic grid storage system. This may increase the overall efficiency of a nuclear plant and provides a storage mechanism that does not exist today in nuclear facilities.

In accordance with one or more embodiments, osmotic grid storage systems may be used for district heating and cooling. An osmotic grid storage system can be coupled with hot water produced from a district heating and cooling system. When power is generated, steam may be recovered through a condenser where heat is rejected. In some instances, such as co-generation systems, that heat is then used for district heating and cooling. Often heat is in the form of hot water that is piped through the streets at a temperature range of 40-50° C. This heat can be used to power an osmotic grid storage system to provide stored power.

In accordance with one or more embodiments, osmotic grid storage systems may be used with an osmotic heat pump. An osmotic grid storage system can be coupled with a geothermal heat pump to provide the necessary heat to recover the draw solution. In this instance, the distillation columns can be eliminated and instead replaced with an underground heat pump that provides the draw solute separation. In this way, small scale osmotic grid storage systems can be deployed anywhere there are reasonable subsurface temperatures providing residential, commercial and distributed energy storage systems.

In accordance with one or more embodiments, grid storage systems may use an electrical energy in, electrical energy out approach. In one example, RO may be used to concentrate a diluted divalent salt solution into a concentrated solution and substantially dilute working fluid. These solutions can be stored indefinitely to store the electricity as chemical potential. When power is needed, PRO may be used to recombine these solutions to create electrical power. In some embodiments, a polishing method may be used to prevent the build up of solutes in the working fluid, such as inclusion of ion exchange or other separation methods. In this way, the osmotic grid storage system may prevent solute build-up. Weak acid and base anion and cation exchange resins, for example, may also be used with multivalent salt solutions. Periodic blow down may also be implemented as disclosed herein.

In accordance with one or more embodiments, devices, systems and methods may generally involve a controller for adjusting or regulating at least one operating parameter of the device or a component of the system, such as, but not limited to, actuating valves and pumps, as well as adjusting a property or characteristic of one or more fluid flow streams. A controller may be in electronic communication with at least one sensor configured to detect at least one operational parameter of the system, such as a concentration, flow rate, pH level or temperature. The controller may be generally configured to generate a control signal to adjust one or more operational parameters in response to a signal generated by a sensor. For example, the controller can be configured to receive a representation of a condition, property, or state of any stream, component or subsystem of an osmotic separation device or grid storage system. The controller typically includes an algorithm that facilitates generation of at least one output signal which is typically based on one or more of any of the representation and a target or desired value such as a set point. In accordance with one or more particular aspects, the controller can be configured to receive a representation of any measured property, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature and pressure may be monitored. Membrane leaks may be detected using ion selective probes, pH meters, tank levels and stream flow rates. Leaks may also be detected by pressurizing a draw solution side of a membrane with gas and using ultrasonic detectors and/or visual observation of leaks at a feedwater side. Other operational parameters and maintenance issues may be monitored. Various process efficiencies may be monitored, such as by measuring product water flow rate and quality, heat flow, electrical energy consumption and energy output. Cleaning protocols for fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier transform infrared (FTIR) spectroscopy or other means of sensing draw solute concentrations. A draw solution condition may be monitored and tracked for makeup addition and/or replacement of solutes. Likewise, product water quality may be monitored by conventional means or with a probe such as an ammonium or ammonia probe. FTIR may be implemented to detect species present providing information which may be useful, for example, to ensure proper plant operation, and for identifying behavior such as membrane ion exchange effects.

In accordance with one or more embodiments, systems and methods may be integrated with an electric grid to meet energy requirements. Systems and methods may be integrated with base load energy to provide standby power, be used to level energy output and add reliability to powered processes. In some embodiments, a power demand may be monitored. A controller associated with disclosed systems may receive a signal indicative of a power demand. In some embodiments, an osmotic power generation process, such as a pressure retarded osmosis process discussed herein, may be initiated or brought online in response to detecting a power demand. Likewise, power generation may be terminated in the absence of a power demand. Separation processes for storage of potential energy in the form of a concentration gradient between a concentrated solution and a substantially deionized solution may be performed when energy is not being produced. In other embodiments, separation processes may be performed concurrently with energy generation.

The function and advantages of these and other embodiments will be more fully understood from the following non-limiting example. The example is intended to be illustrative in nature and is not to be considered as limiting the scope of the embodiments discussed herein.

EXAMPLE 1

Various storage technologies, including the disclosed osmotic systems and methods, were modeled based on comparative size and operational parameters and evaluated in terms of efficiency and capital cost. Table 1, below, summarizes the results regarding efficiency.

TABLE 1

| Storage technology | Efficiency |
| --- | --- |
| Pumped storage | 70-85% |
| Flow batteries | 75-85% |
| Na-S batteries | 85-90% |
| Li-ion batteries | 90-95% |
| Compressed air | 70-80% |
| Fly wheels | 90-95% |
| Osmotic systems | 75-85% |

As indicated, the efficiency of the disclosed osmotic systems and methods is competitive, particularly in view of the fact that waste heat can be used.

The results of the evaluation also indicated that osmotic systems and methods disclosed herein are associated with a lower capital cost per kilowatt relative to the conventional storage technologies. For example, the pumped storage systems were two to four times more expensive. Flow batteries were up to three times more expensive. Sodium-sulfur batteries were up to two and one-half times more expensive. Lithium-ion batteries were up to four times more expensive. Fly wheels were about four times more expensive.

The evaluation illustrated the desirability of disclosed osmotic systems and methods for grid storage in terms of both efficiency and capital cost.

EXAMPLE 2

A cost analysis was performed on an osmotic grid storage system modeled in accordance with one or more embodiments disclosed herein. The system specifications upon which the modeling was based included a total energy storage capacity of 600 MWH, delivery power of 100 MW, a 12 hour delivery time, 150 ATM pressure and a 1 GW coal plant used to supply waste heat. The analysis resulted in an estimated cost per kilowatt hour of $0.08 indicating the viability of osmotic grid storage as an energy solution.

EXAMPLE 3

An analysis was performed to model cost per kilowatt hour as a function of storage capacity for an osmotic grid storage system in accordance with various embodiments. Results presented in Table 2, below, indicate a drop-off of cost per kilowatt hour with increased MWH storage capacity. Tripling the storage more than halved the cost. An estimated $0.098/KWH at 30 MWH storage capacity is attractive compared to conventional grid storage options.

TABLE 2

OGS System Size Comparison

| Delivery Power | 5 MW | 5 MW | 5 MW |
|---|---|---|---|
| Delivery Hours | 2 hours | 4 hours | 6 hours |
| MWH Storage | 10 MWH | 20 MWH | 30 MWH |
| $/KWH | $0.275 | $0.144 | $0.098 |

EXAMPLE 4

Solar thermal is one of the most promising emerging forms of clean electricity with the ability to provide large amounts of future power demand with zero emissions. However, solar thermal technologies require some form of energy storage so they can deliver power during the night when there is no sunlight. Without energy storage, solar thermal electricity is limited and discounted in the market, as it cannot be available 24 hr/day reliably. Solar thermal plants require roughly 16 hours of storage to alleviate this problem—this immediately eliminates many grid storage options (like batteries) that are uneconomical at this scale. The disclosed osmotic grid storage can be constructed anywhere solar thermal plants exist and can store many hours of power at multi-megawatt or multi-gigawatt scales. In addition, because solar thermal is a 'thermal' generation process, there is significant waste heat available (below 150° C.) that does not contribute to power generation. During the day when the plant is producing electricity at capacity, the plant can also be utilizing waste heat for storage without affecting the overall heat rate (output) of the plant. At night, the osmotic battery can be turned on to discharge power and maintain capacity. This level of added reliability can significantly enhance the profitability of a solar thermal power plant.

EXAMPLE 5

Figure 4:
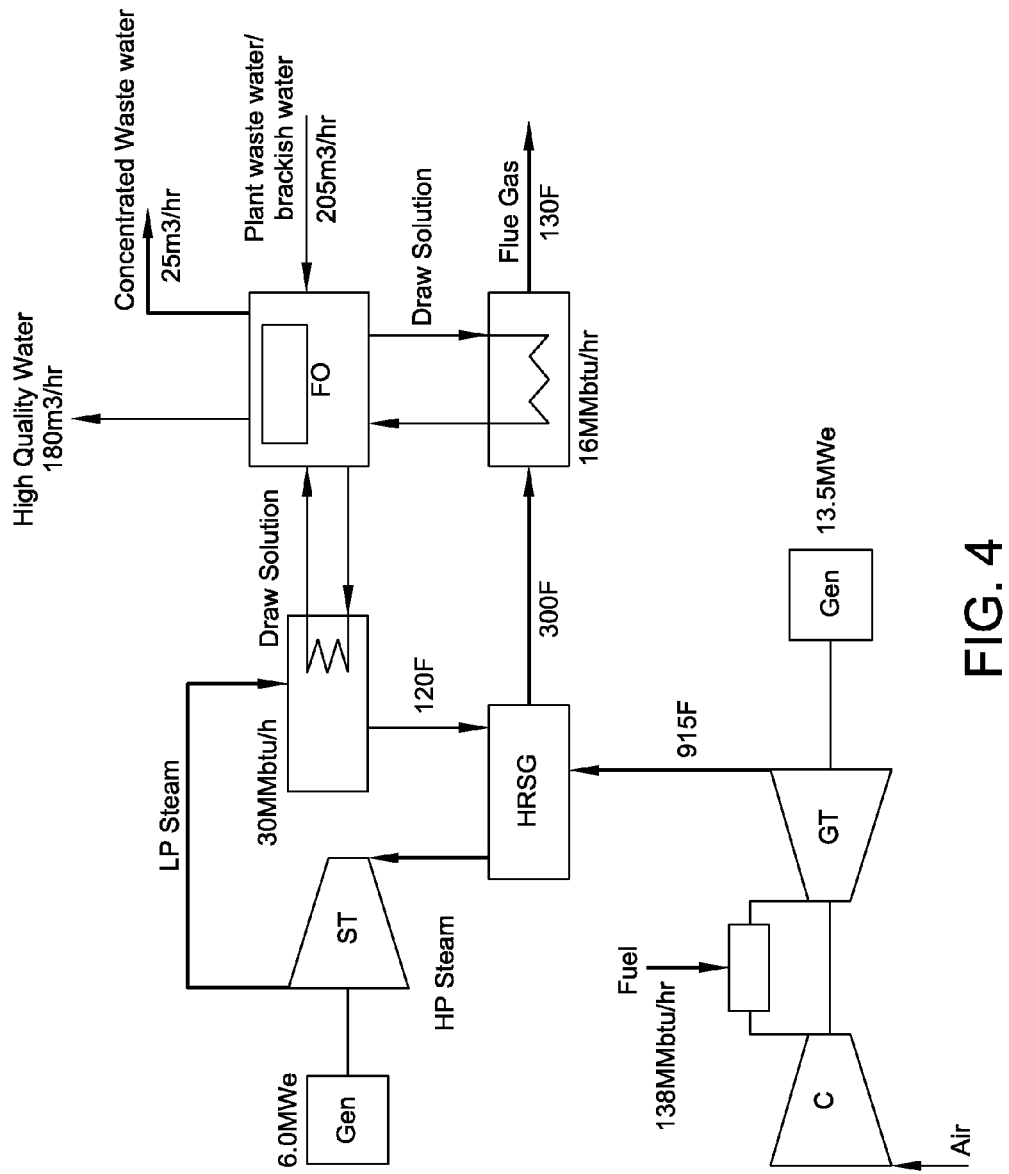
FIG. 4 presents a schematic of a forward osmosis system illustrating use of osmotic grid storage systems and methods combined with a gas turbine combined cycle in accordance with one or more aspects as discussed in accompanying Example 5.

Osmotic grid storage systems and methods may be combined with a gas turbine combined cycle (GTCC) in accordance with one or more embodiments. Preliminary modeling, as presented in the schematic of FIG. 4, suggests a storage capacity in excess of 530 MW.

EXAMPLE 6

Figure 5A:
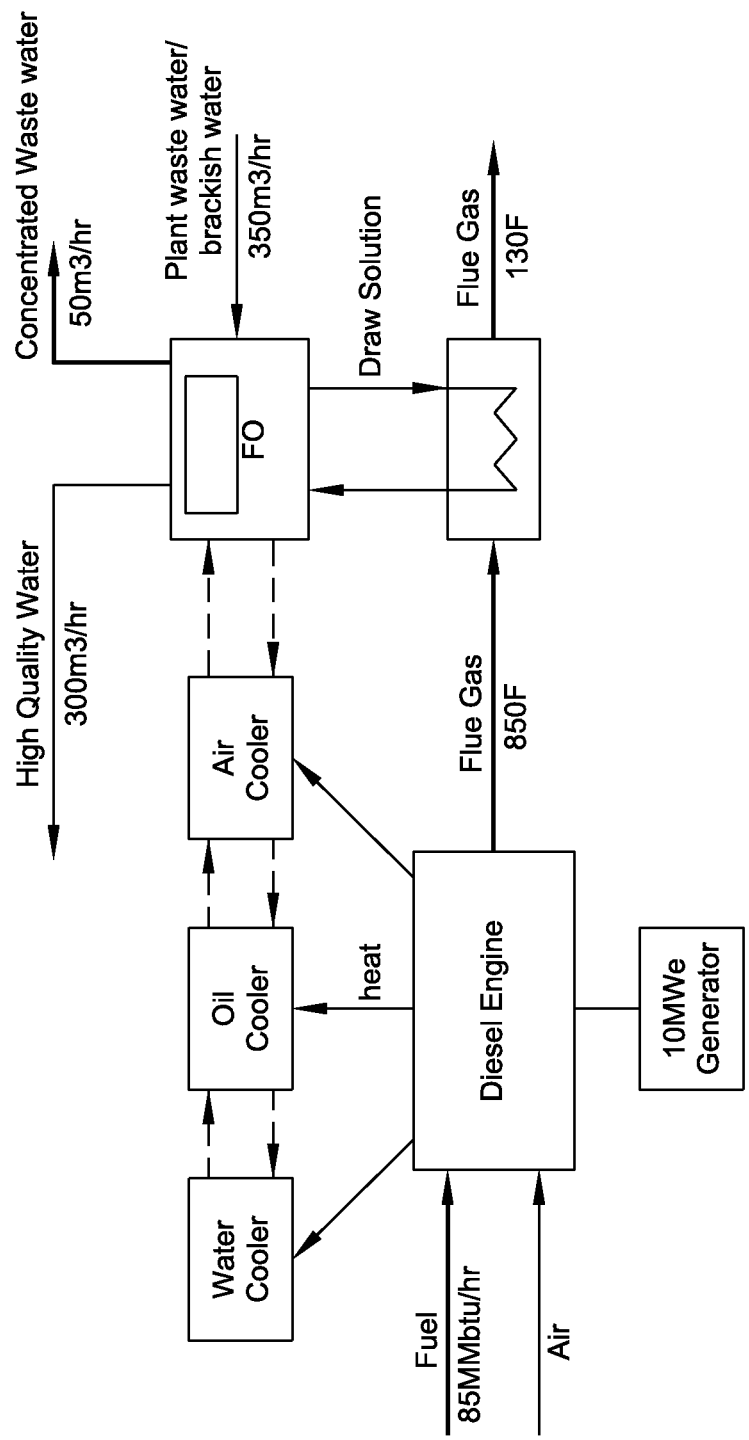
FIGS. 5A and 5B present schematics of forward osmosis systems illustrating use of osmotic grid storage systems and methods combined with a diesel generator in accordance with one or more aspects as discussed in accompanying Example 6.
Figure 5B:
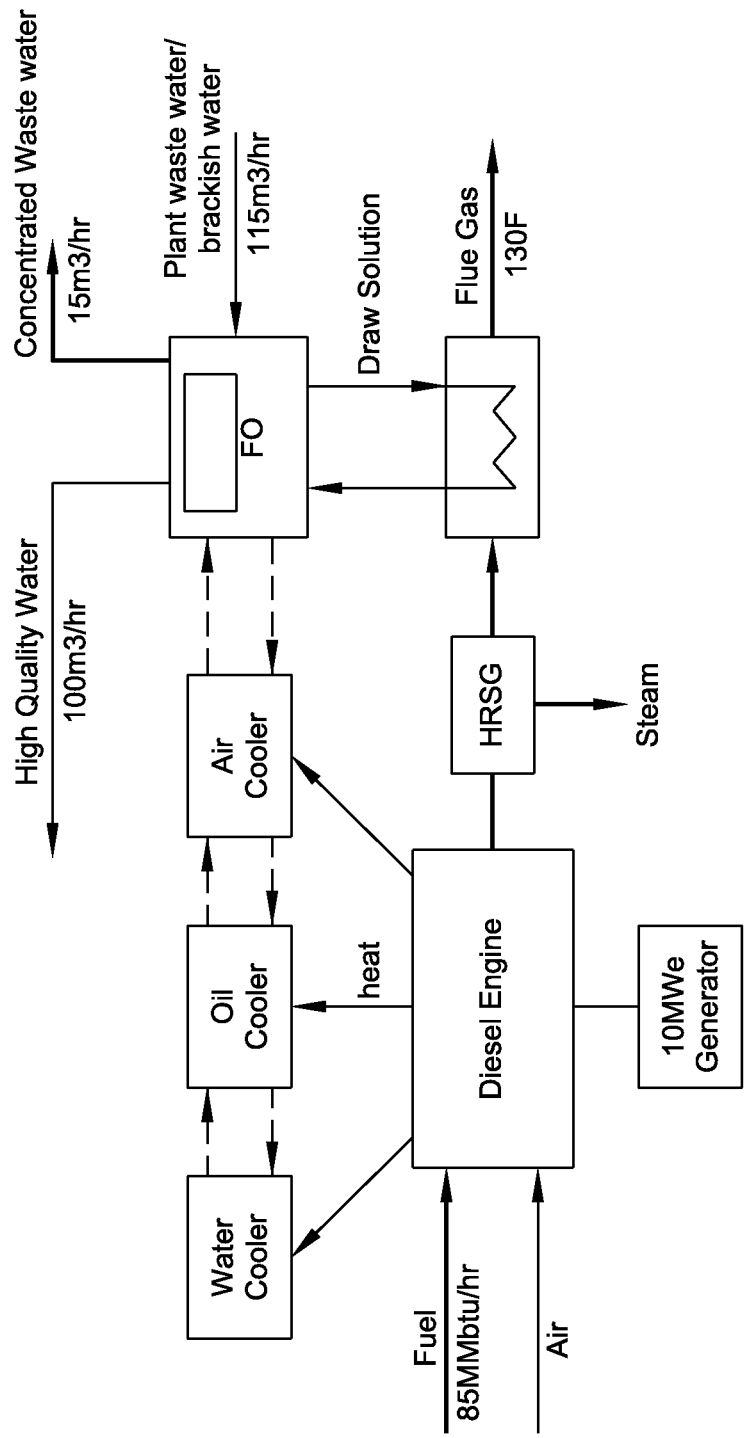

Osmotic grid storage systems and methods may be combined with a diesel generator in accordance with one or more embodiments. As presented in the schematic of FIG. 5A, osmotic storage may be integrated with a 10 MW diesel generator. As presented in the schematic of FIG. 5B, osmotic energy storage may be integrated with a diesel generator as well as a heat recovery steam generator (HRSG) to recover heat from a hot gas stream.

EXAMPLE 7

Figure 6A:
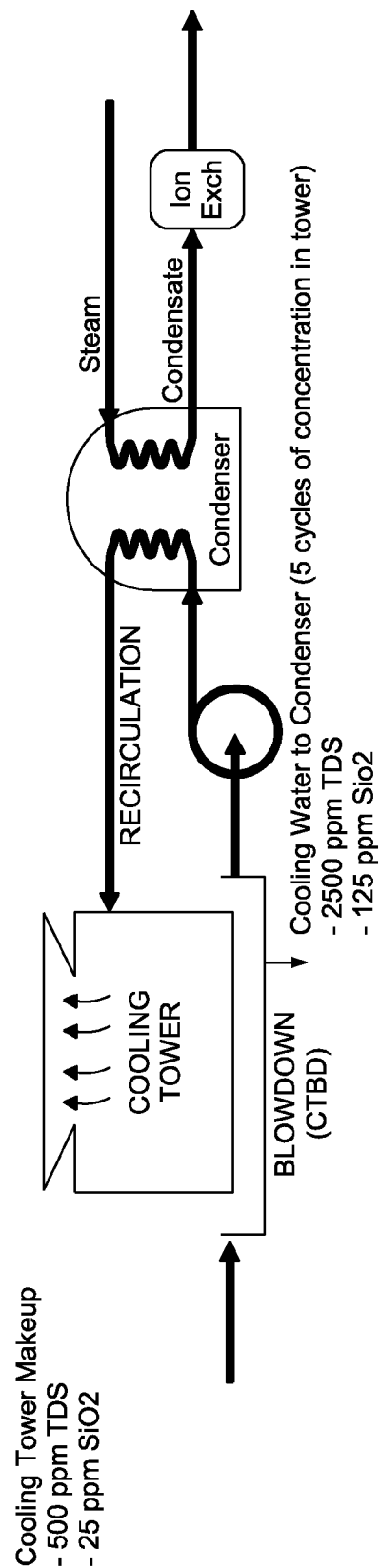
FIGS. 6A and 6B present schematics of forward osmosis systems illustrating use of osmotic grid storage systems and methods combined with power plant cooling processes in accordance with one or more aspects as discussed in accompanying Example 7.
Figure 6B:
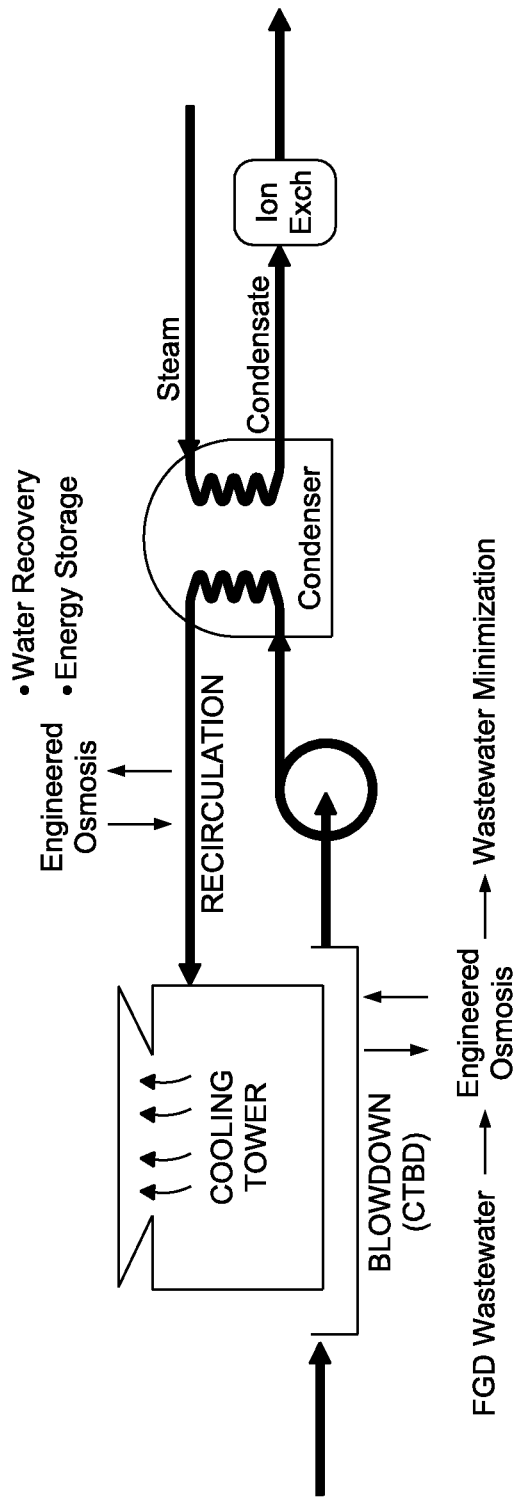

Osmotic grid storage systems and methods may be combined with power plant cooling processes in accordance with one or more embodiments. A typical power plant cooling process is presented in FIG. 6A. FIG. 6B reflects the ease with which osmotic storage may be integrated.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of any appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in any claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A method of operating an electrochemical generator, comprising the steps of:
    providing a separation unit configured for separating a dilute salt solution using at least one of electrical energy or thermal energy;
    providing a membrane module in fluid communication with the separation unit;
    introducing the dilute salt solution to the separation unit;
    introducing at least one of electrical energy or thermal energy to the separation unit to separate the dilute salt solution into a dilute working fluid and a concentrated draw solution;
    directing the dilute working fluid to a first storage tank;
    directing the concentrated draw solution to a second storage tank;
    maintaining the first and second storage tanks in fluidic isolation;
    providing means for interconnecting the membrane module and the first and second storage tanks, wherein the means for interconnecting comprises a controller and a valve;
    in response to a power demand signal, interconnecting the first and second storage tanks with the membrane module, pressurizing a first side of the membrane module, wherein the first side of the membrane module receives the concentrated draw solution from the second storage tank, and fluxing at least a portion of the dilute working fluid across the membrane to produce a pressurized dilute draw solution;
    directing the pressurized dilute draw solution to a pressure exchanger;
    pressurizing a separate working fluid with the pressure exchanger; and
    directing the pressurized separate working fluid to a turbine to generate electrical power.

2. The method of claim 1 further comprising the step of providing an electrical generator coupled to the turbine for generating electricity.

3. The method of claim 2 further comprising the step of providing a grid energy distribution system coupled to the electrical generator for delivering the electricity to an electrical grid.

4. The method of claim 1, wherein the controller controls the system to maintain a salinity difference between the substantially dilute working fluid in the first storage tank and the concentrated draw solution in the second storage tank.

5. The method of claim 1, wherein the separation unit comprises at least one of a distillation column, a pervaporation unit, a membrane separation unit, a reverse osmosis system, a nanofiltration unit, an electrodialysis unit, an ion exchange unit, a capacitive deionization unit, or an electrodeionization unit.

6. The method of claim 1, wherein the membrane module provides at least a portion of the source of dilute salt solution to the separation unit.

7. The method of claim 1, wherein the pressure exchanger is in fluid communication with the separation unit for providing at least a portion of the source of dilute salt solution to the separation unit.

8. The method of claim 1, wherein the dilute draw solution comprises ammonia and carbon dioxide in a ratio of at least 1:1.

9. A method of operating an electrochemical generator, comprising the steps of:
    providing a separation unit configured for separating a dilute salt solution using at least one of electrical energy or thermal energy;
    providing a membrane module in fluid communication with the separation unit;
    introducing the dilute salt solution to the separation unit;
    introducing at least one of electrical energy or thermal energy to the separation unit to separate the dilute salt solution into a dilute working fluid and a concentrated draw solution;
    directing the dilute working fluid to a first storage tank;
    directing the concentrated draw solution to a second storage tank;
    maintaining the first and second storage tanks in fluidic isolation;
    periodically directing at least a portion of the dilute working fluid to a secondary separation unit to maintain a low concentration of solutes therein;
    providing means for interconnecting the membrane module and the first and second storage tanks, wherein the means for interconnecting comprise a controller and a valve; and
    in response to a power demand signal:
        interconnecting the first and second storage tanks with the membrane module
        pressurizing a first side of the membrane module, wherein the first side of the membrane module receives the concentrated draw solution from the second storage tank; and
        fluxing at least a portion of the dilute working fluid across the membrane to produce a pressurized dilute draw solution.

10. The method of claim 9, wherein the secondary separation unit comprises at least one of a distillation column, an ion exchange system, or a reverse osmosis membrane system.

11. The method of claim 9 further comprising the steps of:
    coupling the separation unit to an unreliable power source; and
    directing a portion of power from the unreliable power source to the separation unit to provide the at least one of electrical energy or thermal energy to the separation unit.

12. The method of claim 11 further comprising the step of directing a second portion of power from the unreliable power source to a grid energy distribution system.

13. The method of claim 11, wherein the unreliable power source is selected from the group consisting of solar, thermal, photovoltaic, wind, hydro, biomass, and tidal.

* * * * *

UNITED STATES PATENT AND TRADEMARK OFFICE
CERTIFICATE OF CORRECTION

PATENT NO. : 8,795,525 B2
APPLICATION NO. : 12/630816
DATED : August 5, 2014
INVENTOR(S) : Robert L. McGinnis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this
Twenty-eighth Day of June, 2016

Michelle K. Lee
*Director of the United States Patent and Trademark Office*